(12) United States Patent
Booth et al.

(10) Patent No.: US 7,594,961 B2
(45) Date of Patent: Sep. 29, 2009

(54) INORGANIC PIGMENTS

(75) Inventors: Jonathan Charles Shepley Booth, Reading (GB); Sandra Elizabeth Dann, Loughborough (GB); Duncan Lee John O'Brien, Loughborough (GB)

(73) Assignee: Loughborough University Enterprises Limited, Loughborough (GB)

( * ) Notice: Subject to any disclaimer, the term of this patent is extended or adjusted under 35 U.S.C. 154(b) by 271 days.

(21) Appl. No.: 10/579,957

(22) PCT Filed: Nov. 15, 2004

(86) PCT No.: PCT/GB2004/004794

§ 371 (c)(1),
(2), (4) Date: Aug. 7, 2006

(87) PCT Pub. No.: WO2005/052068

PCT Pub. Date: Jun. 9, 2005

(65) Prior Publication Data

US 2007/0144402 A1  Jun. 28, 2007

(30) Foreign Application Priority Data

Nov. 20, 2003  (GB) ................................. 0326985.9

(51) Int. Cl.
*C03C 1/06* (2006.01)
*C03C 8/14* (2006.01)
*C03C 4/02* (2006.01)
*C01G 35/00* (2006.01)
*C01G 33/00* (2006.01)
*C01G 19/00* (2006.01)

(52) U.S. Cl. ...................... 106/403; 106/400; 106/401; 423/518; 501/17; 501/32

(58) Field of Classification Search ...................... None
See application file for complete search history.

(56) References Cited

U.S. PATENT DOCUMENTS 6,419,736 B1 7/2002 Pfaff et al.
2003/0032192 A1 2/2003 Haubold et al.

FOREIGN PATENT DOCUMENTS

JP  2003221230 A  *  8/2003

OTHER PUBLICATIONS

XP0022314919 (from online database) Cruz, L. P. et al, "Synthesis and Characterization of Tin Niobates," Chemical Abstracts Service, Columbus, OH, retrieved from STN Database, Accession No. 134:320061 cited in the application abstract & *Journal of Solid State Chemistry*, 156(2), 349-354 Coden: JSSCBI; ISSN:0022-4596, 2001.

* cited by examiner

*Primary Examiner*—Melvin C Mayes
*Assistant Examiner*—Colin W Slifka
(74) *Attorney, Agent, or Firm*—Smith-Hill & Bedell, P.C.

(57) ABSTRACT

An inorganic pigment, the pigment comprising a compound which is an oxysulphide or oxyselenide of tin and a metal chosen from niobium or tantalum. The pigments are brightly colored in the color range from yellow, through orange to red, and are especially suitable for the coloration of glass and plastic substrates. Methods for the production of the pigments are also described.

16 Claims, No Drawings

INORGANIC PIGMENTS

This is a national stage application filed under 35 USC 371 based on International Application No. PCT/GB2004/004794 filed Nov. 15, 2004, and claims priority under 35 USC 119 of United Kingdom Patent Application No. 0326985.9 filed Nov. 20, 2003.

This invention relates to pigments, in particular to inorganic pigments having red to yellow hues based on a modified pyrochlore structure. The invention also relates to methods for the production of the pigments and their use for pigmenting glasses and plastics.

The most widely used inorganic pigments for hues between red and yellow are those based on cadmium sulphoselenides. These have excellent colouring strength and are stable in a range of applications. Recently however, concerns have been raised about the environmental impact of the use of cadmium. This has prompted studies to find alternative inorganic pigments, which have similar colours and stabilities to cadmium based pigments, but which do not include toxic metals.

Cruz et al., in the *Journal of Solid State Chemistry*, 156, (2001), p 349-354, report that the colour of tin-niobate, nominally $Sn_2Nb_2O_7$, can range from yellow to red depending on the Sn:Nb ratio. The present applicants have had limited success when attempting to repeat the experiments of Cruz et al., and found it difficult to reliably produce coloured compounds.

There is thus still a need for new inorganic pigments as replacements for those based on cadmium. In accordance with a first aspect of the present invention, an inorganic pigment comprises a compound which is an oxysulphide or oxyselenide of tin and a metal chosen from niobium or tantalum. It is presently thought that the following formula is representative of the pigments of the present invention:

$$Sn_xM_2O_{7-y}A_y$$

wherein A is S or Se; wherein M is Nb or Ta; wherein $1.0 \leq x \leq 2.0$; and wherein $0 < y \leq 0.6$, although the exact stoichiometry has not yet been determined.

The pigments of the invention are brightly coloured and more readily produced than the pure oxide compounds described by Cruz et al. Their colour ranges from yellow through orange to red depending on the values of x and y in the above formula. Preferably, the compound is an oxysulphide of tin and niobium. The pigments have a pyrochlore structure and some are deficient in tin. It is presently thought that the partial replacement of oxygen with sulphur in the lattice may inhibit the formation of compounds which are stoichiometric in terms of tin, although this has yet to be confirmed by experiment.

The pigments are preferably in the form of fine powders. The particle size of the pigments will depend on their intended use as will be known to those skilled in the art. Suitably, the pigments have a particle size of from 0.1 to 50 µm, preferably from 0.1 to 20 µm, more preferably from 0.1 to 10 µm, for example 2 µm.

In accordance with a second aspect of the present invention, a pigmented composition comprises a substrate matrix and a pigment, wherein the pigment comprises a compound which is an oxysulphide or oxyselenide of tin and a metal chosen from niobium or tantalum. Such compositions may be readily prepared according to methods generally known for other pigments Preferably, the compound is an oxysulphide of tin and niobium.

The pigments of the present invention are particularly suitable for the colouration of glasses. The pigments may be combined with at least one glass component to form a coloured glass composition. Any type of glass component is suitable, however low melting glass enamel frits have been found to be particularly suitable. The pigment may comprise from 1 to 50 wt % of the glass composition, preferably however, the pigment comprises from 5 to 10 wt % for example, 8 wt % of the glass composition. Glass compositions coloured using the pigments of the invention may be in any suitable form including glass frits, enamels, glass sheets and glass articles such as bottles and other containers. Methods of colouring glasses using the pigments of the invention will be known to those in the art. Pigmented glasses in the form of frit may be further combined with solvents, binders and other liquid media to form glazes and ceramic printing inks using known methods.

The pigments are also suitable for the colouration of plastics. The pigments may be combined with at least one plastic component to form a coloured plastic composition. Any type of plastic component is suitable. PVC has been found to be particularly suitable. The pigment may comprise from 1 to 50 wt % of the plastic composition however preferably, the pigment comprises from 1 to 10 wt % for example, 5 wt % of the plastic composition. Plastic compositions coloured using the pigments of the invention may be in any suitable form including powders, particulates, films, extrudates, mouldings, and formed into plastic articles such as bottles and other containers. Methods of colouring plastics using the pigments of the invention will be known to those in the art.

Other suitable substrate matrices include liquid carriers such as those used in the production of paints and inks. Exemplary liquid carriers include organic and non-organic solvents, natural and synthetic oils and natural and synthetic resins.

In accordance with a third aspect of the present invention, a method for the production of a pigment as hereinbefore defined comprises the steps of:

(a) intimately mixing SnO, SnA and $M_2O_5$ in an appropriate ratio to produce a reaction mixture; wherein A is S or Se; and wherein M is Nb or Ta, (b) heating the reaction mixture to a temperature of between 800 and 1100° C. to produce a product;

(c) cooling the product.

Mineralisers such as fluorides may be added to enhance the production of the pigment and to provide pigments with improved properties.

In one embodiment, the reaction mixture is heated under vacuum. This may be in a sealed tube or vessel, or in an evacuable furnace. Heating under vacuum is however not preferred for large scale pigment production and thus in an alternative embodiment, the reaction mixture is heated in air or under an inert atmosphere. Alternative or additional mineralisers and additives may be required to ensure successful pigment production under oxidising conditions.

Suitable reaction times, or heating times, may be varied from about 15 minutes up to about 36 hours, and generally may be determined by routine experimentation.

Once formed, it is preferred that the product is comminuted. Suitably, the product is comminuted to a particle size of from 0.1 to 50 µm, preferably, from 0.1 to 20 µm, more preferably from 0.1 to 10 µm, for example 2 µm. Suitable methods will be known to those skilled in the art, for example ball milling or grinding. It may also be desirable to wash the product. Acid washing, for example using concentrated hydrochloric acid, has been found to be effective at removing impurities. It is noteworthy that the pigments show remarkable stability in contact with acid media.

It should be possible to alter the colour of the pigments of the invention by the addition of dopant elements. It is expected that dopant elements would substitute for niobium or tantalum in the crystal structure, although this has not yet been confirmed by experiment. A postulated general formula for such doped pigments may be given as: $Sn_xM_{2-z}M'_zO_{7-y}A_y$, wherein A is S or Se; wherein M is Nb or Ta; wherein M' is a dopant element such as tungsten or molybdenum wherein $1.0 \leq x \leq 2.0$; wherein $0 < y \leq 0.6$; and wherein $0 < z \leq 2.0$. More than one dopant element may be used and the list of dopant elements M' is not exhaustive. Such doped, or modified, pigments are to be understood as being within the scope of the present invention.

The skilled person will be aware of many ways of gaining benefit from the present invention. The invention will now be described by way of example only.

EXAMPLE 1

Preparation of Oxysulphide Pigments

Tin (II) oxide, tin (II) sulphide and niobium (V) oxide were weighed out varying proportions, intimately mixed and sealed into a tube under an inert atmosphere. The tube was heated to between 800 and 1100° C. for 36 hours and then slowly cooled. The cooled product was then washed using hydrochloric acid and finally dried. Pigments ranging in colour from yellow, through orange to red were produced.

EXAMPLE 2

Dispersion in Plastic

Three pigment samples were ball milled to give a D90 particle size of <2 microns. 0.4 g of each pigment was dispersed in 8 g of PVC through manual mixing with a palette knife. 16 drops of dioctylphthalate was added as a plastisizer. The dispersions were drawn down onto float glass with a k-bar to give a thickness of approximately 200 microns. The glass/PVC were heated in an oven at 150° C. for 3 minutes. The cured PVC was peeled off the glass support and placed over white card. Colour measurements were made on the coloured PVC slices using a data colour spectrophotometer the values of which are given in Table 1 below.

TABLE 1

| Sample | l | a | B | c | H |
|---|---|---|---|---|---|
| Yellow | 77.86 | 3.79 | 83.59 | 84.1 | 87.53 |
| Orange | 61.5 | 26.92 | 64.77 | 68.51 | 66.83 |
| Red | 50.51 | 39.91 | 57.08 | 68.6 | 54.63 |

EXAMPLE 3

Glass Enamels

Two pigment samples were mixed with a ground low melting glass enamel frit (B5320f). The pigment loading was kept at 8 wt % pigment. The mixed powders were dispersed into a pine oil based resin using a triple roll mill. The ink produced was screen printed onto float glass pieces with a wet thickness of about 50 microns. The decorated glass tiles were fired at 600° C. to give a glossy enamel finish. Colour measurements on these samples are given in Table 2 below.

TABLE 2

| Sample | L | a | B | c | H |
|---|---|---|---|---|---|
| Yellow | 58.61 | 15.87 | 49.65 | 52.12 | 72.27 |
| Orange | 54.54 | −1.83 | 37.46 | 37.51 | 92.79 |

EXAMPLE 4

Preparation of Pigments in Air

Several mixtures of stannous oxide, niobium oxide and stannous sulphide were mixed in a coffee grinder to give the theoretical stoichiometry, $Sn_2Nb_2O_{7-x}S_x$. The ratio of stannous sulphide to stannous oxide was varied to control the value of x. The mixtures were packed into aluminosilicate crucibles and a ceramic tile was then cemented on the top of the crucible to act as a lid. The samples were fired at 1050° C. After firing a wash in 3M HCl was required to dissolve out metallic tin impurities. As x was varied from 0 to 0.7 the following colour measurements detailed in Table 3 below were made.

TABLE 3

| Sample intended value of x | l | A | b | c | h |
|---|---|---|---|---|---|
| 0 | 76.58 | 2.18 | 68.26 | 68.29 | 88.17 |
| 0.05 | 72.72 | 9.1 | 76.12 | 76.66 | 83.18 |
| 0.1 | 65.95 | 23.38 | 71.22 | 72.46 | 79.36 |
| 0.15 | 62.94 | 17.78 | 67.01 | 69.33 | 75.14 |
| 0.2 | 60.14 | 20.53 | 63 | 66.26 | 71.95 |
| 0.3 | 58.48 | 22.58 | 64.57 | 68.4 | 70.72 |
| 0.4 | 57.54 | 23.38 | 61.16 | 65.47 | 69.08 |
| 0.5 | 55.48 | 26.09 | 62.78 | 67.98 | 67.43 |
| 0.6 | 53.06 | 25.4 | 60.1 | 65.25 | 67.09 |
| 0.7 | 54.02 | 26.6 | 60.46 | 66.05 | 66.26 |

EXAMPLE 5

Pigments were made successfully by replacing the stannous sulphide used in Example 4 with elemental sulphur and tin metal.

EXAMPLE 6

The addition of fluoride mineralisers, particularly tin (II) fluoride was found to aid colour development during the experiments of Example 4. The effect was more pronounced at higher values of x.

The invention claimed is:

1. An inorganic pigment, the pigment comprising a compound of the formula:

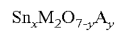

wherein A is S or Se; wherein M is Nb or Ta; wherein $1.0 \leq x \leq 2.0$; and wherein $0 < y \leq 0.6$.

2. A pigmented composition, the composition comprising a substrate matrix and a pigment, wherein the pigment comprises a compound which is an oxysulphide or oxyselenide of tin and a metal chosen from niobium or tantalum and the substrate matrix comprises at least one glass component.

3. A composition according to claim 2, wherein the at least one glass component is a low melting glass enamel frit.

4. A composition according to claim 2, wherein the pigment comprises from 1 to 50 wt % of the composition.

5. A composition according to claim 2, in the form of a glass frit, an enamel, a glass sheet or a glass article.

6. A pigmented composition, the composition comprising a substrate matrix and a pigment, wherein the pigment comprises a compound which is an oxysulphide or oxyselenide of tin and a metal chosen from niobium or tantalum and the substrate matrix comprises at least one plastic component.

7. A composition according to claim 6, wherein the at least one plastic component is PVC.

8. A composition according to claim 6, wherein the pigment comprises from 1 to 50 wt % of the composition.

9. The use of an inorganic pigment, the pigment comprising a compound which is an oxysulphide or oxyselenide of tin and a metal chosen from niobium or tantalum, comprising coloring glasses or plastics using the pigment.

10. A method for the production of an inorganic pigment, the pigment comprising a compound which is an oxysulphide or oxyselenide of tin and a metal chosen from niobium or tantalum, the method comprising the steps of:

(a) intimately mixing SnO, SnA and $M_2O_5$ in an appropriate ratio to produce a reaction mixture; wherein A is S or Se; and wherein M is Nb or Ta,
(b) heating the reaction mixture to a temperature of between 800 and 1100° C., and
(c) cooling the product.

11. A method according to claim 10, wherein the reaction mixture further comprises one or more mineralizers.

12. A method according to claim 10, wherein the reaction mixture is heated under vacuum.

13. A method according to claim 10, wherein the reaction mixture is heated in air.

14. A method according to claim 10, further comprising the step of comminuting the product.

15. A method according to claim 10, further comprising the step of washing the cooled product with an acid.

16. An inorganic pigment, the pigment comprising a compound of the formula $Sn_xM_2M'_zO_{7-y}A_y$, where A is S or Se; M is Nb or Ta; M' is a dopant element; $1.0 \leq x \leq 2.0$; $0 < y \leq 0.6$; and $0 < z \leq 2.0$.

* * * * *